(12) United States Patent
Ozeki et al.

(10) Patent No.: US 10,508,748 B2
(45) Date of Patent: Dec. 17, 2019

(54) CONTROL VALVE

(71) Applicant: YAMADA MANUFACTURING CO., LTD., Kiryu-shi, Gunma (JP)

(72) Inventors: Akifumi Ozeki, Kiryu (JP); Toshihito Nagai, Kiryu (JP)

(73) Assignee: YAMADA MANUFACTURING CO., LTD., Kiryu-Shi (JP)

( * ) Notice: Subject to any disclaimer, the term of this patent is extended or adjusted under 35 U.S.C. 154(b) by 0 days.

(21) Appl. No.: 15/927,567

(22) Filed: Mar. 21, 2018

(65) Prior Publication Data

US 2018/0335153 A1 Nov. 22, 2018

(30) Foreign Application Priority Data

May 18, 2017 (JP) .................................. 2017-098815
Mar. 1, 2018 (JP) .................................. 2018-036486

(51) Int. Cl.
| | |
|---|---|
| *F16K 11/085* | (2006.01) |
| *F01P 7/16* | (2006.01) |
| *F16K 5/04* | (2006.01) |
| *F01P 11/16* | (2006.01) |
| *F01P 7/14* | (2006.01) |

(52) U.S. Cl.
CPC ............ *F16K 11/0853* (2013.01); *F01P 7/16* (2013.01); *F01P 11/16* (2013.01); *F16K 5/0471* (2013.01); *F16K 5/0485* (2013.01); *F16K 11/0856* (2013.01); *F01P 2007/146* (2013.01)

(58) Field of Classification Search
CPC ............ F16K 11/0853; F16K 11/0856; F16K 5/0485; F16K 5/0471; F01P 11/16; F01P 7/16; F01P 2007/146
See application file for complete search history.

(56) References Cited

U.S. PATENT DOCUMENTS

| | | | | |
|---|---|---|---|---|
| 2,840,109 | A | * | 6/1958 | Wadleigh .............. F16K 11/085 137/625.11 |
| 3,233,865 | A | * | 2/1966 | Panzica .................... F16K 5/04 137/625.47 |
| 5,529,026 | A | * | 6/1996 | Kurr .................. B60H 1/00485 123/41.1 |

(Continued)

FOREIGN PATENT DOCUMENTS

| | | |
|---|---|---|
| DE | 102010026368 | 1/2012 |
| EP | 2295757 | 3/2011 |

(Continued)

*Primary Examiner* — Craig J Price
*Assistant Examiner* — Andrew J Rost
(74) *Attorney, Agent, or Firm* — Rankin, Hiss & Clark LLP (57) ABSTRACT

There is provided a control valve including a casing, a rotor that has a rotary shaft rotatably supported by the casing via bushings, and a sealing ring that is disposed on an inner side of each bushing in an axial direction. Both end portions of the rotary shaft are formed into stepped shapes which respectively come into contact with the bushings from the inner side in the axial direction. Areas of both the end portions of the rotary shaft projected in the axial direction are set to be equal to each other. Penetration holes which allow portions on outer sides of the sealing rings in the axial direction to be open to the atmosphere are respectively formed on a bottom wall portion and a lid body of the casing.

4 Claims, 5 Drawing Sheets (56) References Cited

U.S. PATENT DOCUMENTS

| | | | | |
|---|---|---|---|---|
| 5,617,815 A | * | 4/1997 | Spies | F16K 11/076 |
| | | | | 123/41.1 |
| 5,941,206 A | * | 8/1999 | Smith | F01L 7/023 |
| | | | | 123/190.4 |
| 6,994,316 B2 | | 2/2006 | Pervaiz | |
| 2016/0003125 A1 | * | 1/2016 | Lee | F16K 11/076 |
| | | | | 123/41.08 |

FOREIGN PATENT DOCUMENTS

| | | |
|---|---|---|
| JP | 5246670 | 4/2013 |
| JP | 6050952 | 12/2016 |

\* cited by examiner

CONTROL VALVE

CROSS-REFERENCE TO RELATED APPLICATION

Priority is claimed on Japanese Patent Application No. 2017-098815, filed May 18, 2017 and Japanese Patent Application No. 2018-036486, filed Mar. 1, 2018, the contents of which is incorporated herein by reference.

BACKGROUND

Field

The present invention relates to a control valve.

Description of Related Art

In the related art, cooling systems for cooling an engine using cooling water are known. In these types of cooling systems, there are cases in which a plurality of heat exchange flow channels through which cooling water circulates between various heat exchangers are provided separately from a radiator flow channel for circulation between a radiator and an engine.

In such cooling systems, a control valve for controlling a flow of the cooling water to each of the flow channels is provided in a bifurcation portion leading to each of the flow channels (the radiator flow channel, the heat exchange flow channel, and the like).

The control valve described above includes a casing that has an outflow opening for cooling water, and a rotor that is configured to be rotatable inside the casing and has a flow passage through which the cooling water flows. A communication opening, which causes the flow passage and the outflow opening to communicate with each other in accordance with rotation of the rotor, is formed in the rotor.

According to the configuration, when the rotor rotates, the outflow opening and the communication opening switch between communication and isolation. Then, the cooling water which has flowed into the control valve flows out from the control valve through the outflow opening in a state of communicating with the communication opening, during a process of flowing through the flow passage. Accordingly, the cooling water which has flowed into the control valve is distributed to one or a plurality of flow channels in accordance with rotation of the rotor.

Here, according to the configuration in Japanese Patent No. 6050952, a rotor has a rotor main body in which an opening portion (corresponding to the communication opening described above) is formed, and a rotary shaft which is disposed on an inner side of the rotor main body and is supported by a casing via a bearing portion. A gap is provided between an outer circumferential surface of the rotor main body and an inner circumferential surface of the casing, and between an end surface of the rotor main body directed in an axial direction and an end surface of the casing directed in the axial direction (for example, refer to Paragraphs (0033) to (0038) in Japanese Patent No. 6050952).

According to the configuration, rotation of the rotor can be prevented from being hindered due to foreign substances (contamination) caught between the rotor main body and the casing. However, the above-described configuration having a gap provided between the rotor main body and the casing is a technology which has been known before the application of Japanese Patent No. 6050952, for example, as disclosed in Japanese Patent No. 5246670, specification of U.S. Pat. No. 6,994,316, specification of European Patent Application, Publication No. 2295757, and specification of German Patent Application, Publication No. 102010026368.

Specifically, in Paragraph (0076), FIG. 12, and the like, Japanese Patent No. 5246670 discloses a configuration in which a clearance is provided to prevent a solid body from being interposed between a cross-sectional adjusting member and a base member.

Specification of U.S. Pat. No. 6,994,316 discloses a configuration in which a gap is provided between a rotor and a body (refer to FIG. 4 and the like).

Specification of European Patent Application, Publication No. 2295757 discloses a configuration in which a gap is provided between a circumferential wall of a housing and a wall of a control element (refer to FIG. 5 and the like).

Specification of German Patent Application, Publication No. 102010026368 discloses a configuration in which a gap is provided between a housing and a cross-sectional adjustment member (refer to FIG. 1 and the like).

Incidentally, in the above-described configurations of Japanese Patent No. 6050952, Japanese Patent No. 5246670, specification of U.S. Pat. No. 6,994,316, specification of European Patent Application, Publication No. 2295757, and specification of German Patent Application, Publication No. 102010026368, in the rotor, both end portions of the rotary shaft in the axial direction are rotatably supported by shaft supporting walls of the casing. Specifically, a first side end portion of the rotary shaft penetrates a first shaft support wall and protrudes out of the casing. The first side end portion of the rotary shaft is coupled to an actuator which rotationally drives the rotor outside the casing.

On the other hand, a second shaft support wall supporting a second side end portion of the rotary shaft is generally disposed in a flow channel of cooling water. Therefore, the second side end portion of the rotary shaft is immersed in the cooling water inside the casing.

However, in the configurations of above-described patent documents, in the rotary shaft, a load acting on a first side end surface due to atmospheric pressure is smaller than a load acting on a second side end surface due to a fluid pressure inside the casing. When a load acting on the rotary shaft in the axial direction differs between both the end surfaces, there is a possibility that the rotor will be pressed to a lower pressure side (actuator side).

In the case described above, for example, there is a possibility that the following disadvantages will occur.

(1) Since the rotor is pressed toward the actuator, a load torque of the actuator increases. Accordingly, the actuator is required to have a high output and to be increased in size.

(2) There is a need to provide a thrust bearing for supporting the rotary shaft in the axial direction at all times separately from a radial bearing rotatably supporting the rotary shaft, thereby leading to an increase in the number of components and an increase in size in the axial direction.

(3) Since the communication opening formed in the rotor and the outflow opening formed in the casing are misaligned from each other in the axial direction, desired flow rate characteristics cannot be achieved.

SUMMARY

The present invention provides a control valve in which a load torque, the number of components, and the size are prevented from increasing and desired flow rate characteristics can be achieved.

According to a first aspect of the present invention, there is provided a control valve including a casing, a rotor, a first sealing ring, and a second sealing ring. The casing has a tube portion in which an outflow opening for a fluid is formed, and a first shaft support wall and a second shaft support wall which respectively block both end opening portions of the tube portion in an axial direction. The rotor has a rotary shaft which includes a first side end portion rotatably supported by the first shaft support wall via a first bearing and a second side end portion rotatably supported by the second shaft support wall via a second bearing, and a valve tube portion which surrounds the rotary shaft and in which a communication opening communicating with the outflow opening in accordance with a rotation of the rotary shaft is formed. The first sealing ring is disposed between a position on an inner side of the first bearing in the axial direction on the first shaft support wall and the rotary shaft. The second sealing ring is disposed between a position on an inner side of the second bearing in the axial direction on the second shaft support wall and the rotary shaft. The first side end portion of the rotary shaft is formed into a stepped shape having a first stepped surface which is able to come into contact with the first bearing from the inner side in the axial direction. The second side end portion of the rotary shaft is formed into a stepped shape having a second stepped surface which is able to come into contact with the second bearing from the inner side in the axial direction. Areas of the first side end portion and the second side end portion projected in the axial direction are set to be equal to each other.
Open-to-atmosphere portions which allow portions on outer sides of the first sealing ring and the second sealing ring in the axial direction to be open to the atmosphere are respectively formed on the first shaft support wall and the second shaft support wall.

According to the present aspect, since atmospheric pressure acts on both the end portions of the rotary shaft in the axial direction through the open-to-atmosphere portions, no differential pressure is caused in the pressure acting on both the end portions of the rotary shaft. Therefore, for example, compared to a case in which pressures acting on both the end portions of the rotary shaft are different from each other as in a configuration in which one end portion of the rotary shaft is disposed in cooling water, it is easy to equally set loads acting on the rotary shaft in the axial direction.

Furthermore, in the present aspect, the areas of both end surfaces of the rotary shaft in the axial direction (pressure receiving surfaces of the rotary shaft in the axial direction) projected in the axial direction are equal to each other. Therefore, loads acting on the pressure receiving surfaces of the rotary shaft due to atmospheric pressure become equal to each other. Accordingly, the rotary shaft can be prevented from being pressed to the lower pressure side in the axial direction.

Therefore, for example, the present aspect exhibits the following effects.

(1) The rotor is prevented from being pressed toward an actuator, so that an increase in load torque of the actuator can be prevented. Therefore, the actuator can be prevented from having a high output and being increased in size.

(2) Since a load transmitted from the rotary shaft to the casing or the actuator in the axial direction can be reduced, there is no need to newly provide a thrust bearing separately from a radial bearing. Accordingly, the number of components can be reduced and the size of the control valve can be prevented from being increased in the axial direction. In addition, even if a thrust bearing is provided separately from the radial bearing, a simple thrust bearing can be selected at a low cost, so that the cost of the control valve can be reduced.

(3) Since the rotor can be prevented from being misaligned in the axial direction with respect to the casing, the outflow opening formed in the casing, and the communication opening of the rotor can be set at desired positions in the axial direction. Accordingly, desired flow rate characteristics can be achieved.

According to a second aspect of the present invention, the rotary shaft may have an outer shaft portion which is formed integrally with the valve tube portion and with which the first sealing ring and the second sealing ring are in tight contact, and an inner shaft portion which is insert-molded on an inner side of the outer shaft portion in a radial direction, is rotatably supported by the first bearing and the second bearing, and has rigidity higher than the rigidity of the outer shaft portion. Surfaces of the outer shaft portion facing the outside in the axial direction may respectively configure the first stepped surface and the second stepped surface.

According to the present aspect, since the rotary shaft is formed to have the inner shaft portion which is insert-molded on the inner side of the outer shaft portion in the radial direction, durability of the rotor can be ensured, and the rotor can be molded with high accuracy.

Particularly, in the present aspect, since the outer shaft portion having rigidity lower than the rigidity of the inner shaft portion is configured to come into contact with the bearing and the sealing ring, abrasion and the like of the bearing and the sealing ring are prevented, so that durability of the bearing and the sealing ring can be improved.

According to a third aspect of the present invention, a regulation wall surrounding a periphery of the open-to-atmosphere portion may be formed on at least one shaft supporting wall of the first shaft support wall and the second shaft support wall.

According to the present aspect, movement of contamination toward the open-to-atmosphere portion on the outer surface of one shaft supporting wall is inhibited by the regulation wall. Therefore, contamination can be prevented from entering the inside of the casing through the open-to-atmosphere portion.

According to the control valve, a load torque, the number of components, and the size are prevented from increasing and desired flow rate characteristics can be achieved.

DETAILED DESCRIPTION OF THE INVENTION

Hereinafter, an embodiment of the present invention will be described based on the drawings. In the description below, a case in which a cooling system for cooling an engine using cooling water employs a control valve of the present embodiment will be described.

[Cooling System]

Figure 1:
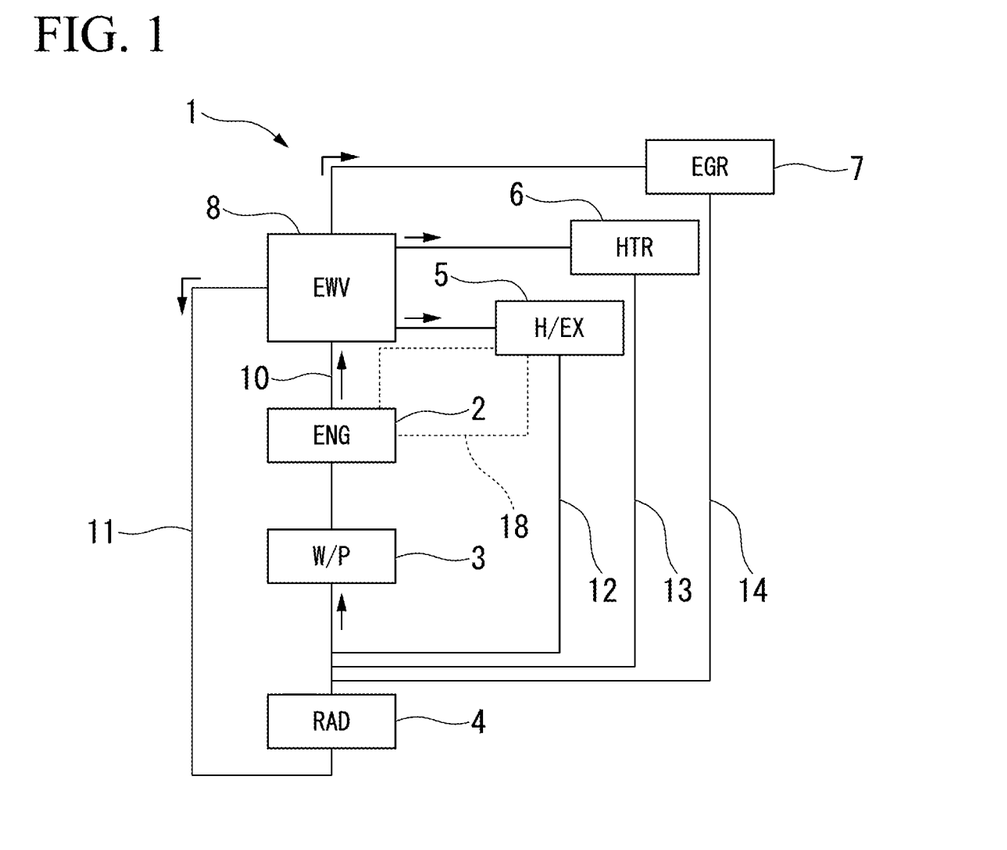
FIG. 1 is a block diagram of a cooling system according to an embodiment.

FIG. 1 is a block diagram of a cooling system 1.

As illustrated in FIG. 1, the cooling system 1 is mounted in a vehicle equipped with at least an engine as a vehicle driving source. In addition to a vehicle having only an engine, the vehicle may be a hybrid vehicle, a plug-in hybrid vehicle, or the like.

The cooling system 1 has a configuration in which an engine 2 (ENG), a water pump 3 (W/P), a radiator 4 (RAD), a heat exchanger 5 (H/EX), a heater core 6 (HTR), an EGR cooler 7 (EGR), and a control valve 8 (EWV) are connected to each other through various flow channels 10 to 14.

The water pump 3, the engine 2, and the control valve 8 are connected in order on the main flow channel 10 from the upstream side to the downstream side. In the main flow channel 10, the cooling water passes through the engine 2 and the control valve 8 in order in accordance with an operation of the water pump 3.

Each of the radiator flow channel 11, the warming-up flow channel 12, the air conditioning flow channel 13, and the EGR flow channel 14 is connected to the main flow channel 10. The radiator flow channel 11, the warming-up flow channel 12, the air conditioning flow channel 13, and the EGR flow channel 14 individually connect an upstream part of the water pump 3 and the control valve 8 with each other in the main flow channel 10.

The radiator 4 is connected to the radiator flow channel 11. In the radiator flow channel 11, heat is exchanged between the cooling water and outside air via the radiator 4.

The heat exchanger 5 is connected to the warming-up flow channel 12. Engine oil circulates between the heat exchanger 5 and the engine 2 through an oil flow channel 18. In the warming-up flow channel 12, heat is exchanged between the cooling water and the engine oil via the heat exchanger 5. That is, the heat exchanger 5 functions as an oil warmer for warming the engine oil when a water temperature is higher than an oil temperature. On the other hand, the heat exchanger 5 functions as an oil cooler for cooling the engine oil when the water temperature is lower than the oil temperature.

The heater core 6 is connected to the air conditioning flow channel 13. For example, the heater core 6 is provided inside a duct (not illustrated) of an air conditioner. In the air conditioning flow channel 13, heat is exchanged between the cooling water and air-conditioning air which flows through inside the duct, via the heater core 6.

The EGR cooler 7 is connected to the EGR flow channel 14. In the EGR flow channel 14, heat is exchanged between the cooling water and an EGR gas via the EGR cooler 7.

In the cooling system 1 described above, the cooling water which has passed through the engine 2 via the main flow channel 10 flows into the control valve 8. Thereafter, the cooling water is selectively distributed to the various flow channels 11 to 14 in accordance with an operation of the control valve 8. Accordingly, early warming, high-water temperature (optimum temperature) control, and the like can be realized, and improvement of fuel efficiency of the vehicle is achieved.

<Control Valve>

Figure 2:
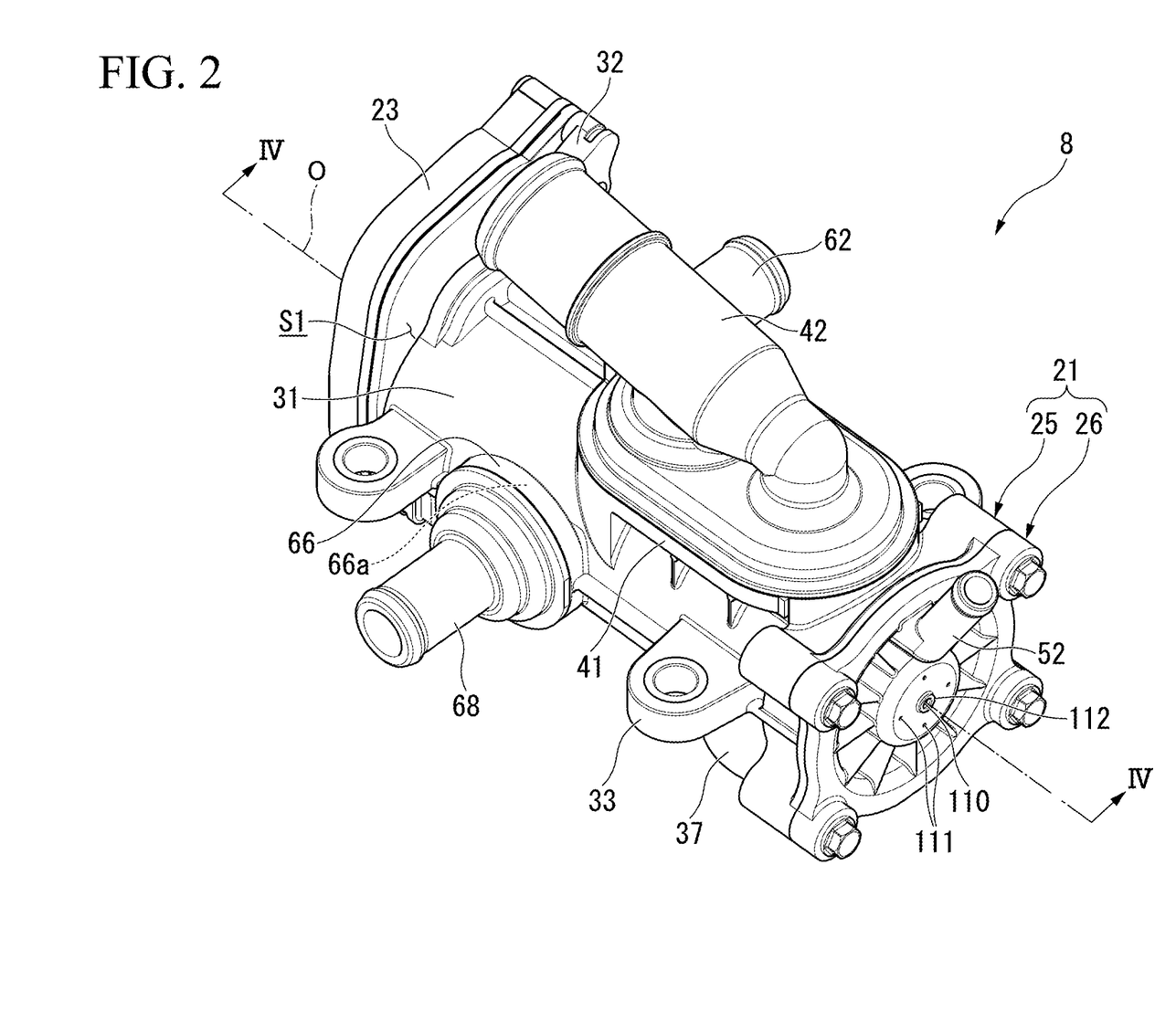
FIG. 2 is a perspective view of a control valve according to the embodiment.
Figure 3:
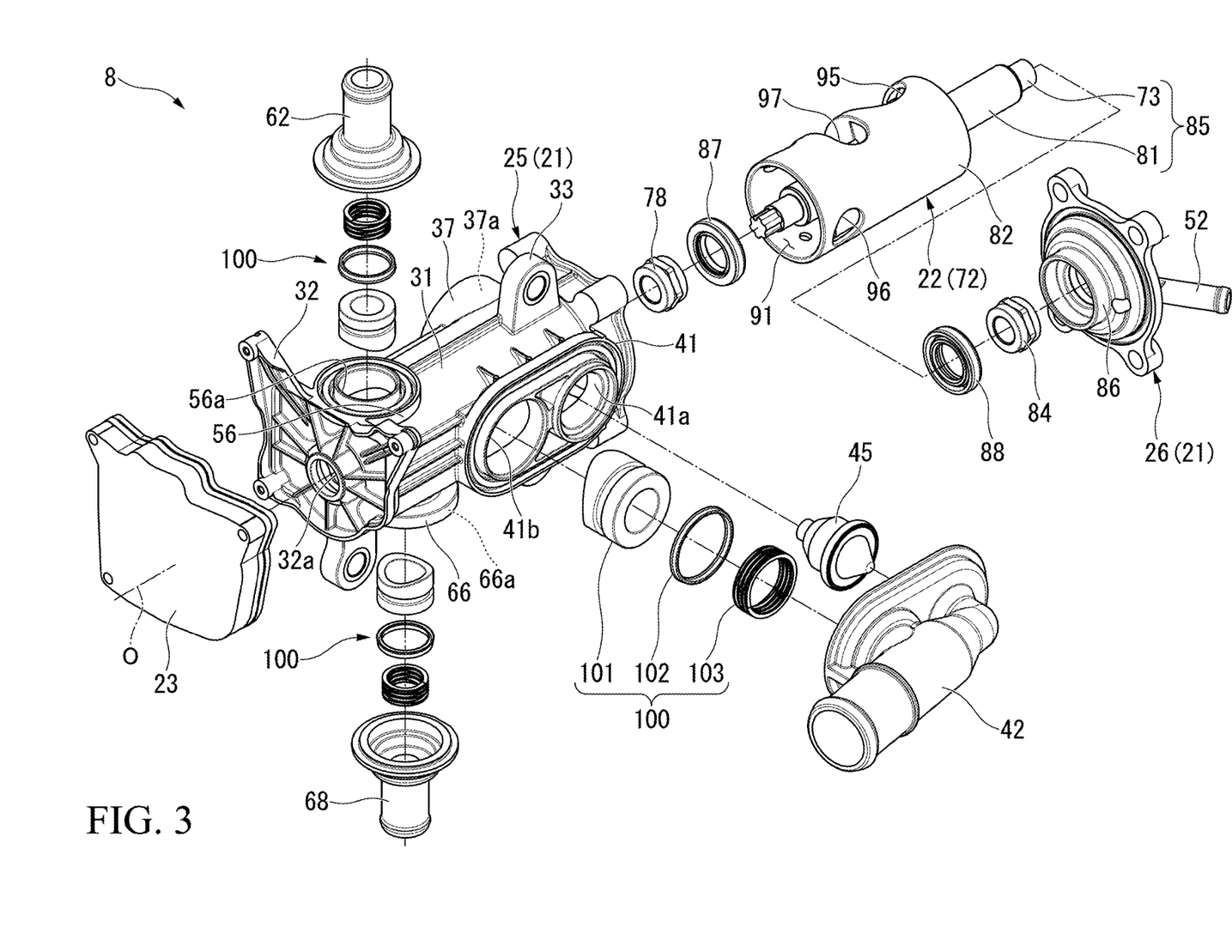
FIG. 3 is an exploded perspective view of the control valve according to the embodiment.

FIG. 2 is a perspective view of the control valve 8. FIG. 3 is an exploded perspective view of the control valve 8.

As illustrated in FIGS. 2 and 3, the control valve 8 includes a casing 21, a rotor 22 (refer to FIG. 3), and a drive unit 23.

(Casing)

The casing 21 has a bottomed tube-shaped casing main body 25 and a lid body 26 which blocks an opening portion of the casing main body 25. In the description below, a direction along an axial line O of the casing 21 will be simply referred to as an axial direction. In the axial direction, a direction toward a bottom wall portion (first shaft support wall) 32 of the casing main body 25 with respect to a circumferential wall portion (tube portion) 31 of the casing main body 25 will be referred to as a first side. A direction toward the lid body (second shaft support wall) 26 with respect to the circumferential wall portion 31 of the casing main body 25 will be referred to as a second side. Moreover, a direction orthogonal to the axial line O will be referred to as a radial direction. A direction around the axial line O will be referred to as a circumferential direction.

A plurality of attachment pieces 33 are formed in the circumferential wall portion 31 of the casing main body 25. Each of the attachment pieces 33 is provided to protrude outward in the radial direction from the circumferential wall portion 31. For example, the control valve 8 is fixed inside an engine room via each of the attachment pieces 33. The positions, the number, and the like of the attachment pieces 33 can be suitably changed.

Figure 4:
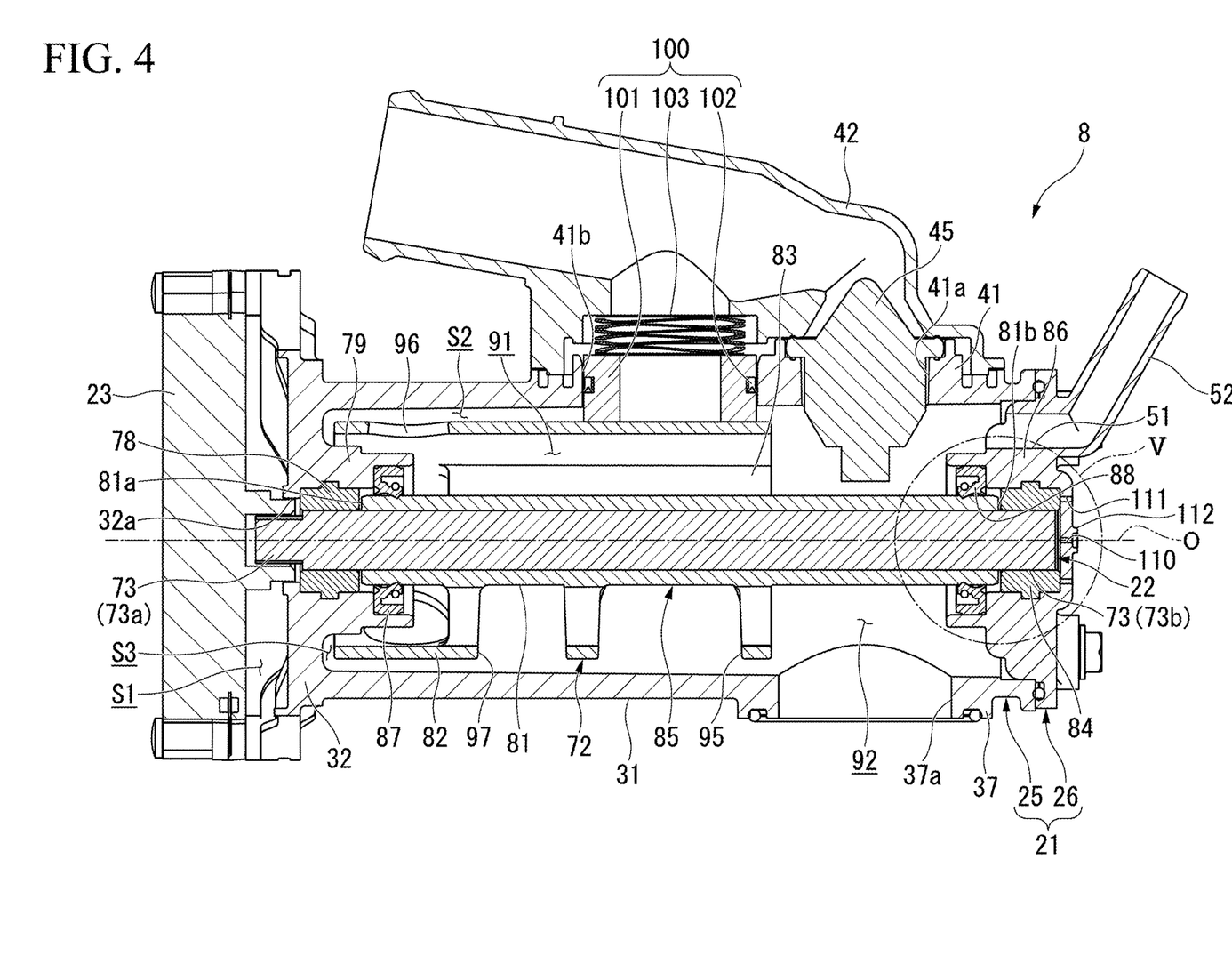
FIG. 4 is a cross-sectional view taken along line IV-IV in FIG. 2.

FIG. 4 is a cross-sectional view taken along line IV-IV in FIG. 2.

As illustrated in FIGS. 3 and 4, an inflow port 37 bulging outward in the radial direction is formed in a position on the second side in the circumferential wall portion 31. An inflow opening 37a (refer to FIG. 4) penetrating the inflow port 37 in the radial direction is formed in the inflow port 37. The inflow opening 37a allows the inside and the outside of the casing 21 to communicate with each other. The above-described main flow channel 10 (refer to FIG. 1) is connected to an opening end surface (radially outward end surface) of the inflow port 37.

As illustrated in FIG. 4, in the circumferential wall portion 31, a radiator port 41 bulging outward in the radial direction is formed at a position facing the inflow port 37 in the radial direction while having the axial line O interposed therebetween.

In the radiator port 41, a fail opening 41a and a radiator outflow opening 41b are formed side by side in the axial direction. The fail opening 41a and the radiator outflow opening 41b individually penetrate the radiator port 41 in the radial direction. In the present embodiment, the fail opening 41a faces the above-described inflow opening 37a in the radial direction. In addition, the radiator outflow opening 41b is positioned on the first side in the axial direction with respect to the fail opening 41a.

A radiator joint 42 is connected to the opening end surface (radially outward end surface) of the radiator port 41. The radiator joint 42 connects the radiator port 41 and an upstream end portion of the radiator flow channel 11 (refer to FIG. 1) with each other. The radiator joint 42 is welded (for example, vibration welding) onto the opening end surface of the radiator port 41.

A thermostat 45 is provided in the fail opening 41a. That is, the thermostat 45 faces the above-described inflow opening 37a in the radial direction. The thermostat 45 opens and closes the fail opening 41a in accordance with the temperature of the cooling water flowing inside the casing 21.

An EGR outflow opening 51 is formed in a position near the radiator port 41 in the radial direction with respect to the axial line O in the lid body 26. The EGR outflow opening 51 penetrates the lid body 26 in the axial direction. In the present embodiment, the EGR outflow opening 51 intersects (is orthogonal to) an opening direction (radial direction) of the fail opening 41a. In addition, at least a portion of the EGR outflow opening 51 overlaps the thermostat 45 in a front view seen in the axial direction.

In the lid body 26, an EGR joint 52 is formed at an opening edge of the EGR outflow opening 51. The EGR joint 52 is formed into a tube shape extending outward in the radial direction toward the second side in the axial direction. The EGR joint 52 connects the EGR outflow opening 51 and an upstream end portion of the above-described EGR flow channel 14 (refer to FIG. 1) with each other. In the present embodiment, the EGR joint 52 is formed integrally with the lid body 26. However, the EGR joint 52 may be formed separately from the lid body 26. In addition, the EGR outflow opening 51 and the EGR joint 52 may be provided in the circumferential wall portion 31 or the like.

As illustrated in FIG. 3, in the circumferential wall portion 31, a warming-up port 56 bulging outward in the radial direction is formed in a position on the first side of the radiator port 41 in the axial direction. A warming-up outflow opening 56a penetrating the warming-up port 56 in the radial direction is formed in the warming-up port 56.

A warming-up joint 62 is connected to the opening end surface of the warming-up port 56. The warming-up joint 62 connects the warming-up port 56 and an upstream end portion of the above-described warming-up flow channel 12 (refer to FIG. 1) with each other.

As illustrated in FIG. 2, in the circumferential wall portion 31, an air-conditioning port 66 is formed between the radiator port 41 and the warming-up port 56 in the axial direction, that is, at a position misaligned with respect to the warming-up port 56 in the circumferential direction by approximately 180°. An air-conditioning outflow opening 66a penetrating the air-conditioning port 66 in the radial direction is formed in the air-conditioning port 66. An air-conditioning joint 68 is connected to the opening end surface of the air-conditioning port 66. The air-conditioning joint 68 connects the air-conditioning port 66 and an upstream end portion of the above-described air-conditioning flow channel 13 (refer to FIG. 1) with each other.

(Drive Unit)

As illustrated in FIG. 2, the drive unit 23 is attached to the bottom wall portion 32 of the casing main body 25. The drive unit 23 is configured to store a motor, a speed reducer, a control board, and the like (not illustrated). As illustrated in FIG. 4, a gap S1 is provided between the drive unit 23 and the bottom wall portion 32 in parts other than a fastening part of the drive unit 23 and the bottom wall portion 32.

(Rotor)

As illustrated in FIGS. 3 and 4, the rotor 22 is accommodated inside the casing 21. The rotor 22 is formed into a cylinder shape disposed coaxially with the axial line O of the casing 21. When the rotor 22 rotates around the axial line O, each of the above-described outflow openings (radiator outflow opening 41b, the warming-up outflow opening 56a, and the air-conditioning outflow opening 66a) is opened and closed.

As illustrated in FIG. 4, the rotor 22 is configured to have an inner shaft portion 73 which is insert-molded onto the inner side of a rotor main body 72.

The inner shaft portion 73 is formed of a material having rigidity higher (for example, a metal material) than the rigidity of the rotor main body 72 (for example, a resin material). The inner shaft portion 73 extends coaxially with the axial line O. For example, the rotor 22 may be integrally formed of a resin material or the like.

A first side end portion of the inner shaft portion 73 penetrates the bottom wall portion 32 in the axial direction through a penetration hole (open-to-atmosphere portion) 32a formed in the bottom wall portion 32. The first side end portion of the inner shaft portion 73 is rotatably supported by a first bushing (first bearing) 78 provided in the above-described bottom wall portion 32. Specifically, a first shaft accommodation wall 79 is formed in the bottom wall portion 32 toward the second side in the axial direction. The first shaft accommodation wall 79 surrounds the above-described penetration hole 32a. The above-described first bushing 78 is fitted on the inner side of the first shaft accommodation wall 79.

In the inner shaft portion 73, a coupling portion 73a is formed at a position on the first side of the first bushing 78 in the axial direction (part positioned on the outer side of the bottom wall portion 32). The coupling portion 73a is formed to have a diameter smaller than parts (large diameter portion 73b) other than the coupling portion 73a in the inner shaft portion 73, and a spline is formed on an outer circumferential surface thereof. The coupling portion 73a is coupled to the above-described drive unit 23 outside the casing 21. Accordingly, power of the drive unit 23 is transmitted to the inner shaft portion 73.

Figure 5:
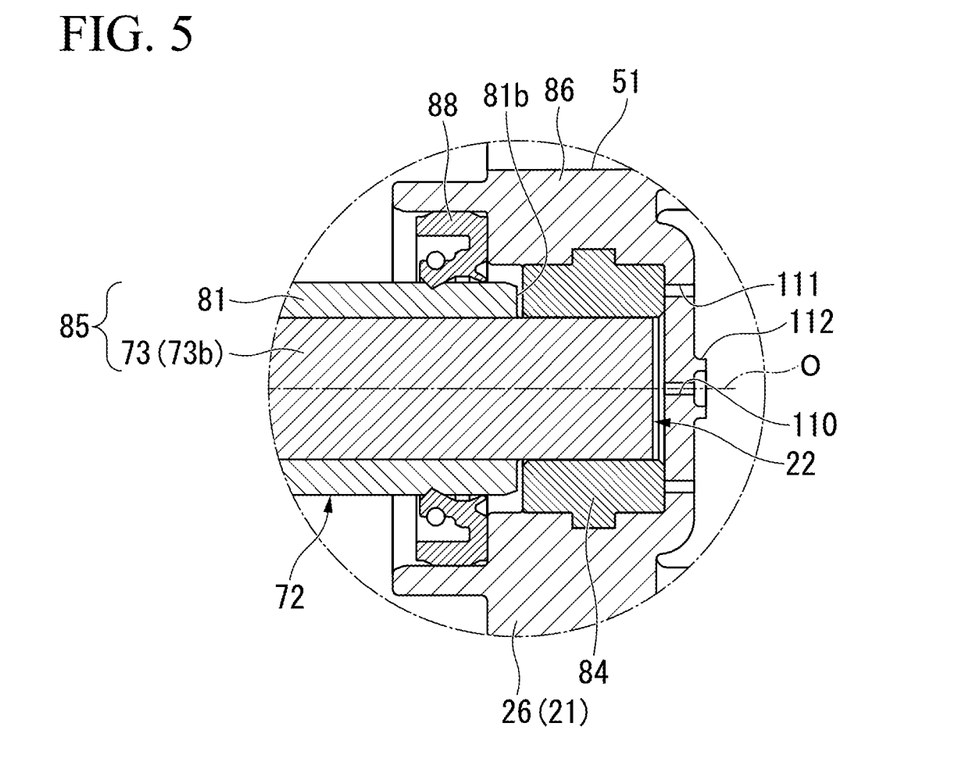
FIG. 5 is an enlarged view of the V-section in FIG. 4.

FIG. 5 is an enlarged view of the V-section in FIG. 4.

As illustrated in FIG. 5, a second side end portion of the inner shaft portion 73 is rotatably supported by a second bushing (second bearing) 84 provided in the above-described lid body 26. Specifically, a second shaft accommodation wall 86 is formed in the lid body 26 toward the first side in the axial direction. The second shaft accommodation wall 86 surrounds the axial line O on the inner side of the above-described EGR outflow opening 51 in the radial direction. The above-described second bushing 84 is fitted on the inner side of the second shaft accommodation wall 86.

As illustrated in FIG. 4, the rotor main body 72 surrounds the periphery of the above-described inner shaft portion 73. The rotor main body 72 has an outer shaft portion 81 covering the inner shaft portion 73, a valve tube portion 82 enclosing the outer shaft portion 81, and a spoke portion 83 causing the outer shaft portion 81 and the valve tube portion 82 to be coupled to each other.

The outer shaft portion 81 surrounds the periphery of the inner shaft portion 73 throughout the entire circumference in a state in which both the end portions in the axial direction in the inner shaft portion 73 are exposed. In the present embodiment, a rotary shaft 85 of the rotor 22 is configured of the outer shaft portion 81 and the inner shaft portion 73.

Both the end portions of the rotary shaft 85 in the axial direction (portions on outer sides of below-described sealing rings 87 and 88 in the axial direction) are formed into stepped shapes such that the outer diameter is gradually reduced in diameter from the inner side in the axial direction toward the outer side. Specifically, the outer diameter of the first side end portion of the rotary shaft 85 is reduced in the order of the outer shaft portion 81, the large diameter portion 73b of the inner shaft portion 73, and the coupling portion 73a. A first side end surface (first stepped surface) 81a of the outer shaft portion 81 in the axial direction is configured to be able to come into contact with the above-described first bushing 78 from the second side in the axial direction.

On the other hand, the outer diameter of the second side end portion of the rotary shaft 85 is reduced in the order of the outer shaft portion 81, and the large diameter portion 73b of the inner shaft portion 73. A second side end surface (second stepped surface) 81b of the outer shaft portion 81 in the axial direction is configured to be able to come into contact with the above-described second bushing 84 from the first side in the axial direction. That is, the bushings 78 and 84 of the present embodiment support the rotary shaft 85 in the radial direction and the axial direction.

Within the above-described first shaft accommodation wall 79, the first sealing ring 87 is provided in a position on the second side in the axial direction with respect to the first bushing 78. The first sealing ring 87 seals an area between an inner circumferential surface of the first shaft accommodation wall 79 and an outer circumferential surface of the rotary shaft 85 (outer shaft portion 81).

On the other hand, within the above-described second shaft accommodation wall 86, the second sealing ring 88 is provided in a position on the first side in the axial direction with respect to the second bushing 84. The second sealing ring 88 seals an area between an inner circumferential surface of the second shaft accommodation wall 86 and the outer circumferential surface of the rotary shaft 85 (outer shaft portion 81).

The valve tube portion 82 is disposed coaxially with the axial line O. The valve tube portion 82 is disposed in a position on the first side of the inflow opening 37a in the axial direction inside the casing 21. Specifically, the valve tube portion 82 is disposed at a position avoiding the fail opening 41a across the radiator outflow opening 41b, the warming-up outflow opening 56a, and the air-conditioning outflow opening 66a in the axial direction. The inner side of the valve tube portion 82 configures a flow passage 91, and the cooling water which has flowed into the casing 21 through the inflow opening 37a flows through the flow passage 91 in the axial direction. On the other hand, inside the casing 21, a position on the second side of the valve tube portion 82 in the axial direction configures a connection flow channel 92 communicating with the flow passage 91. A gap S2 is provided between the outer circumferential surface of the valve tube portion 82 and the inner circumferential surface of the circumferential wall portion 31 in the radial direction. In addition, a gap S3 is provided between the first side end surface in the axial direction of the valve tube portion 82 and the second side end surface in the axial direction of the bottom wall portion 32 in the axial direction.

In the valve tube portion 82, a radiator communication opening 95 penetrating the valve tube portion 82 in the radial direction is formed at the same position as the above-described radiator outflow opening 41b in the axial direction. In a case in which at least a portion of the radiator communication opening 95 overlaps the radiator outflow opening 41b when seen in the radial direction, the radiator outflow opening 41b and the inside of the flow passage 91 communicate with each other through the radiator communication opening 95.

In the valve tube portion 82, a warming-up communication opening 96 penetrating the valve tube portion 82 in the radial direction is formed at the same position as the above-described warming-up outflow opening 56a in the axial direction. In a case in which at least a portion of the warming-up communication opening 96 overlaps the warming-up outflow opening 56a when seen in the radial direction, the warming-up outflow opening 56a and the inside of the flow passage 91 communicate with each other through the warming-up communication opening 96.

In the valve tube portion 82, an air-conditioning communication opening 97 penetrating the valve tube portion 82 in the radial direction is formed at the same position as the above-described air-conditioning outflow opening 66a in the axial direction. In a case in which at least a portion of the air-conditioning communication opening 97 overlaps the air-conditioning outflow opening 66a when seen in the radial direction, the air-conditioning outflow opening 66a and inside of the flow passage 91 communicate with each other through the air-conditioning communication opening 97.

The rotor 22 causes the inside of the flow passage 91 and each of the outflow openings 41b, 56a, and 66a to switch between communication and isolation in accordance with rotation around the axial line O. A communication pattern between the outflow opening and the communication opening can be suitably set. The layout of the outflow opening and the communication opening can be switched in accordance with the set communication pattern. The outflow opening and the communication opening corresponding to each other need only be disposed at positions in which at least portions thereof overlap each other in the axial direction.

As illustrated in FIG. 3, a sealing mechanism 100 is provided inside the above-described radiator port 41 (radiator outflow opening 41b). The sealing mechanism 100 has a slide ring 101, a sealing ring 102, and a biasing member 103.

As illustrated in FIG. 4, the slide ring 101 is inserted into the radiator outflow opening 41b. An inner side end surface of the slide ring 101 in the radial direction is slidably in contact with the outer circumferential surface of the valve tube portion 82. In the present embodiment, the inner side end surface of the slide ring 101 in the radial direction is a curved surface formed along the radius of curvature in the valve tube portion 82.

The sealing ring 102 is externally fitted to the slide ring 101. The outer circumferential surface of the sealing ring 102 is slidably in tight contact with the inner circumferential surface of the radiator outflow opening 41b.

The biasing member 103 is interposed between the outer side end surface of the slide ring 101 in the radial direction and the radiator joint 42. The biasing member 103 biases the slide ring 101 toward the inner side in the radial direction (toward the valve tube portion 82).

As illustrated in FIG. 3, a sealing mechanism 100 having a configuration similar to that of the sealing mechanism 100 provided inside the radiator outflow opening 41b is also provided inside the above-described warming-up outflow opening 56a and the air-conditioning outflow opening 66a. In the present embodiment, the same reference signs as those of the sealing mechanism 100 provided inside the radiator outflow opening 41b are applied to the sealing mechanism 100 provided inside the warming-up outflow opening 56a and the air-conditioning outflow opening 66a, and description thereof will not be repeated.

As illustrated in FIG. 4, within the first shaft accommodation wall 79, a position on the first side of the first sealing ring 87 in the axial direction is open to the atmosphere through the penetration hole 32a. Therefore, atmospheric pressure acts on the first side end portion of the rotary shaft 85 (part positioned on the first side of the sealing part of the first sealing ring 87 (outer shaft portion 81) in the axial direction in the rotary shaft 85) through the gap S1 between the drive unit 23 and the bottom wall portion 32, the penetration hole 32a, the gap between the first shaft accommodation wall 79 and the first bushing 78, and the like. In this case, in the first side end portion of the rotary shaft 85, there are three pressure receiving surfaces (which will hereinafter be referred to as "first pressure receiving surfaces") in the axial direction, that is, a first side end surface of the coupling portion 73a, a first side end surface of the large diameter portion 73b, and the first side end surface 81a of the outer shaft portion 81.

On the other hand, as illustrated in FIG. 5, a penetration hole (open-to-atmosphere portion) 110 penetrating the lid body 26 in the axial direction is formed in the lid body 26. Specifically, the penetration hole 110 is positioned coaxially with the axial line O in the lid body 26. In the lid body 26, an outer side penetration hole 111 which is a trace of a pin gate at the time of resin molding is formed in a position on an outer side of the penetration hole 110 in the radial direction. In the present embodiment, a plurality of outer side penetration holes 111 are formed with a clearance in the circumferential direction around the axial line O. It is preferable that the inner diameters of the above-described penetration holes 110 and 111 be smaller than the gaps S2 and S3 between the casing 21 and the valve tube portion 82. Accordingly, even if contamination enters the inside of the casing 21 through the penetration holes 110 and 111, rotation of the rotor 22 can be prevented from being hindered due to the contamination caught between the casing 21 and the valve tube portion 82. However, the number, the shape, the position, and the like of the penetration holes 110 and 111 can be suitably subjected to a change in design.

Within the second shaft accommodation wall 86, a space defined on the second side of the sealing part between the rotary shaft 85 and the second sealing ring 88 in the axial direction is open to the atmosphere through the penetration hole 110. Therefore, atmospheric pressure acts on the second side end portion of the rotary shaft 85 (part positioned on the second side of the sealing part of the second sealing ring 88 (outer shaft portion 81) in the axial direction in the rotary shaft 85) through the penetration hole 110. That is, the present embodiment is configured to cause no differential pressure in the pressure acting on both the end portions of the rotary shaft 85. The penetration hole 110 is not limited to being coaxial with the axial line O as long as at least a portion thereof is formed at a position facing the inner shaft portion 73 (large diameter portion 73b) in the axial direction in the lid body 26 and communicates with an area defined by the lid body 26, the second bushing 84, and the second side end surface of the large diameter portion 73b.

In the second side end portion of the rotary shaft 85, pressure receiving surfaces (which will hereinafter be referred to as "second pressure receiving surfaces") in the axial direction are the second side end surface of the large diameter portion 73b and the second side end surface 81b of the outer shaft portion 81. In the present embodiment, areas of the first pressure receiving surface and the second pressure receiving surface projected in the axial direction are set to be equal to each other. The shapes of both the end portions of the rotary shaft 85 in the axial direction can be suitably changed as long as both thereof have a stepped shape and the areas of the pressure receiving surfaces are equal to each other.

In the present embodiment, a regulation wall 112 protruding to the second side in the axial direction is formed in a position on the inner side of the second shaft accommodation wall 86 in the radial direction in the lid body 26. The regulation wall 112 surrounds the periphery of the above-described penetration hole 110.

[Method of Operating Control Valve]

Next, a method of operating the above-described control valve 8 will be described.

As illustrated in FIG. 1, in the main flow channel 10, cooling water sent out from the water pump 3 is subjected to a heat exchange in the engine 2. Thereafter, the cooling water flows toward the control valve 8. As illustrated in FIG. 4, the cooling water which has passed through the engine 2 in the main flow channel 10 flows into the connection flow channel 92 inside the casing 21 through the inflow opening 37a.

In the cooling water which has flowed into the connection flow channel 92, a portion of the cooling water flows into the EGR outflow opening 51. The cooling water which has flowed into the EGR outflow opening 51 is supplied to the inside of the EGR flow channel 14 through the EGR joint 52.

The cooling water supplied to the inside of the EGR flow channel 14 is subjected to a heat exchange between the cooling water and the EGR gas in the EGR cooler 7. Thereafter, the cooling water returns to the main flow channel 10.

On the other hand, in the cooling water which has flowed into the connection flow channel 92, the cooling water which has not flowed into the EGR outflow opening 51 flows into the flow passage 91 from the second side in the axial direction. The cooling water which has flowed into the flow passage 91 is distributed to each of the outflow openings during a process of flowing through the inside of the flow passage 91 in the axial direction. That is, the cooling water flowing into the flow passage 91 is distributed to each of the flow channels 11 to 14 through the outflow opening which communicates with the communication opening among the outflow openings.

In the control valve 8, in order to switch the communication pattern between the outflow opening and the communication opening, the rotor 22 is rotated around the axial line P. Then, rotation of the rotor 22 is stopped at a position corresponding to the communication pattern intended to be set, so that the outflow opening and the communication opening communicate with each other in the communication pattern corresponding to the stop position of the rotor 22.

In this manner, the present embodiment is configured to have the rotary shaft 85 in which the first side end portion is open to the atmosphere through the penetration hole 32a and the second side end portion is open to the atmosphere through the penetration hole 110.

According to the configuration, no differential pressure is caused in the pressure acting on both the end portions of the rotary shaft 85. Therefore, for example, compared to a case in which pressures acting on the pressure receiving surfaces are different from each other as in a configuration in which one end portion of the rotary shaft 85 is disposed in the cooling water, it is easy to equally set loads acting on the pressure receiving surfaces of the rotary shaft 85.

Particularly, in the present embodiment, the areas of the pressure receiving surfaces at both the end portions of the rotary shaft 85 in the axial direction are configured to be equal to each other.

According to the configuration, loads acting on the pressure receiving surfaces of the rotary shaft 85 due to atmospheric pressure become equal to each other. Accordingly, the rotary shaft 85 can be prevented from being pressed to the lower pressure side in the axial direction.

Therefore, for example, the present embodiment exhibits the following effects.

(1) The rotor 22 is prevented from being pressed toward the drive unit 23, so that an increase in load torque of the drive unit 23 can be prevented. Therefore, the drive unit 23 can be prevented from having a high output and being increased in size.

(2) Since a load transmitted from the rotary shaft 85 to the casing 21 or the drive unit 23 in the axial direction can be reduced, there is no need to newly provide a thrust bearing separately from a radial bearing. Accordingly, the number of components can be reduced and the size of the control valve can be prevented from being increased in the axial direction. In addition, even if a thrust bearing is provided separately from the radial bearing, a simple thrust bearing can be selected at a low cost, so that the cost of the control valve 8 can be reduced.

(3) Since the rotor 22 can be prevented from being misaligned in the axial direction with respect to the casing 21, the outflow opening formed in the casing 21, and the communication opening of the rotor 22 can be set at desired positions in the axial direction. Accordingly, desired flow rate characteristics can be achieved.

In the present embodiment, since the rotary shaft 85 is formed to have the inner shaft portion 73 which is insert-molded on the inner side of the outer shaft portion 81, durability of the rotor 22 can be ensured, and the rotor 22 can be molded with high accuracy.

Particularly, in the present embodiment, the outer shaft portion 81 having rigidity lower than the rigidity of the inner shaft portion 73 is configured to come into contact with the bushings 78 and 84 and the sealing rings 87 and 88. Therefore, abrasion and the like of the bushings 78 and 84 and the sealing rings 87 and 88 are prevented, so that durability of the bushings 78 and 84 and the sealing rings 87 and 88 can be improved.

In the present embodiment, the regulation wall 112 surrounding the penetration hole 110 is configured to be provided in the lid body 26.

According to the configuration, movement of contamination toward the penetration hole 110 on the outer surface (second side end surface) of the lid body 26 is inhibited by the regulation wall 112. Therefore, contamination can be prevented from entering the inside of the casing 21 through the penetration hole 110.

The technical range of the present invention is not limited to the embodiment described above and includes embodiments realized by adding various changes to the above-described embodiment within a range not departing from the gist of the present invention.

For example, in the embodiment described above, the configuration in which the control valve 8 is mounted in the cooling system 1 of the engine 2 has been described. However, the control valve 8 is not limited to only this configuration and may be mounted in different systems.

In the embodiment described above, the configuration in which the cooling water which has flowed into the control valve 8 is distributed to the radiator flow channel 11, the warming-up flow channel 12, the air-conditioning flow channel 13, and the EGR flow channel 14 has been described. However, the embodiment is not limited to only this configuration. The control valve 8 need only be configured to distribute the cooling water flowing into the control valve 8 to at least two flow channels.

In addition, the layout, the type, the shape, and the like of each of the communication openings and the outflow openings can also be suitably changed.

In the embodiment described above, the configuration in which each of the joints is welded onto the opening end surface of each of the communication openings has been described. However, the embodiment is not limited to only this configuration, and each of the joints may be fixed to the opening end surface of each of the communication openings by a different method (for example, bonding or fastening).

In the embodiment described above, the configuration in which, for example, the inflow opening, the communication openings, and the outflow openings individually penetrate the valve tube portion 82 and the casing 21 in the radial direction has been described. However, the embodiment is not limited to only this configuration. For example, the communication openings and the outflow openings may individually penetrate the valve tube portion 82 and the casing 21 in the axial direction.

In the embodiment described above, the configuration in which the fail opening 41a communicates with the radiator flow channel 11 has been described. However, the embodiment is not limited to only this configuration.

In the embodiment described above, the configuration in which the regulation wall 112 is provided on the periphery of the penetration hole 110 has been described. However, the embodiment is not limited to only this configuration. For example, a filter may be installed inside the penetration hole.

Examples of the filter include an osmotic membrane which allows entry of outside air but regulates entry of water, contamination, and the like. Accordingly, contamination and the like can be reliably prevented from entering through the penetration hole.

The pressure receiving surfaces are not required to strictly coincide with each other. There may be some manufacturing errors within a range exhibiting the operational effects of the present embodiment described above.

In the embodiment described above, the configuration in which the rotor 22 (the valve tube portion 82) and the casing 21 (the circumferential wall portion 31) are formed into the cylindrical shape (of which the diameter is uniform over the axial direction) has been described. However, the embodiment is not limited to only this configuration. That is, the outside diameter of the valve tube portion 82 and the inside diameter of the circumferential wall portion 31 may be changed in the axial direction as long as the valve tube portion 82 is configured to rotate inside the circumferential wall portion 31.

In this case, various types of shapes may be employed for the valve tube portion 82 and the circumferential wall portion 31, for example, a spherical shape (a shape of which diameter is gradually reduced from a center portion to both end portions in the axial direction), a shape where the spherical shapes lie in the axial direction, a tapered shape (a shape of which diameter is gradually changed from a first side to a second side in the axial direction), a stepped shape (a shape of which diameter is changed in stepwise from the first side to the second side in the axial direction). In the embodiment described above, the configuration in which both ends of the valve tube portion 82 of the rotor 22 in the axial direction are opened has been described. However, the embodiment is not limited to only this configuration. The design of the rotor 22 can be appropriately changed as long as the cooling water is able to enter inside the valve tube portion 82. For example, the rotor 22 may be configured to have block portions blocking both end opening portions of the valve tube portion 82 in the axial direction. In this case, the block portions may be formed with communication holes, and the like communicating the inside and the outside of the rotor 22. Alternatively, the block portion(s) may be configured to block at least one of the opening portions of the valve tube portion 82 in the axial direction.

Furthermore, the constituent elements in the above-described embodiment can be suitably replaced with known constituent elements within a range not departing from the gist of the present invention. In addition, the above-described modification example may be suitably combined. The present invention is not limited to the description above but is limited to only the accompanying aspects of the invention.

What is claimed is:
1. A control valve comprising:
   a casing that has
      a tube portion in which an outflow opening for a fluid is formed, and
      a first shaft support wall and a second shaft support wall which respectively block both end opening portions of the tube portion in an axial direction;
   a rotor that has a rotary shaft which includes a first side end portion rotatably supported by the first shaft support wall via a first bearing and a second side end portion rotatably supported by the second shaft support wall via a second bearing, and a valve tube portion which surrounds the rotary shaft and in which a communication opening communicating with the outflow opening in accordance with a rotation of the rotary shaft is formed;

a first sealing ring that is disposed between a position on an inner side of the first bearing in the axial direction on the first shaft support wall and the rotary shaft; and a second sealing ring that is disposed between a position on an inner side of the second bearing in the axial direction on the second shaft support wall and the rotary shaft, wherein the first side end portion of the rotary shaft is formed into a stepped shape having a first stepped surface which is able to come into contact with the first bearing from the inner side in the axial direction, wherein the second side end portion of the rotary shaft is formed into a stepped shape having a second stepped surface which is able to come into contact with the second bearing from the inner side in the axial direction, wherein areas of the first side end portion and the second side end portion projected in the axial direction are set to be equal to each other, wherein open-to-atmosphere portions which allow portions on outer sides of the first sealing ring and the second sealing ring in the axial direction to be open to the atmosphere are respectively formed on the first shaft support wall and the second shaft support wall, wherein a plurality of outer side penetration holes is formed on an outer side of one of the open-to-atmosphere portions in a radial direction, and wherein inner diameters of the outer side penetration holes and the one of the open-to-atmosphere portions are smaller than gaps between the casing and the valve tube portion.

2. The control valve according to claim 1, wherein a regulation wall surrounding a periphery of the open-to-atmosphere portion is formed on at least one shaft supporting wall of the first shaft support wall and the second shaft support wall.

3. A control valve comprising:
a casing that has
  a tube portion in which an outflow opening for a fluid is formed, and
  a first shaft support wall and a second shaft support wall which respectively block both end opening portions of the tube portion in an axial direction;
a rotor that has
  a rotary shaft which includes a first side end portion rotatably supported by the first shaft support wall via a first bearing and a second side end portion rotatably supported by the second shaft support wall via a second bearing, and
  a valve tube portion which surrounds the rotary shaft and in which a communication opening communicating with the outflow opening in accordance with a rotation of the rotary shaft is formed;
a first sealing ring that is disposed between a position on an inner side of the first bearing in the axial direction on the first shaft support wall and the rotary shaft; and
a second sealing ring that is disposed between a position on an inner side of the second bearing in the axial direction on the second shaft support wall and the rotary shaft, wherein the first side end portion of the rotary shaft is formed into a stepped shape having a first stepped surface which is able to come into contact with the first bearing from the inner side in the axial direction, wherein the second side end portion of the rotary shaft is formed into a stepped shape having a second stepped surface which is able to come into contact with the second bearing from the inner side in the axial direction, wherein areas of the first side end portion and the second side end portion projected in the axial direction are set to be equal to each other, wherein open-to-atmosphere portions which allow portions on outer sides of the first sealing ring and the second sealing ring in the axial direction to be open to the atmosphere are respectively formed on the first shaft support wall and the second shaft support wall, wherein the rotary shaft has an outer shaft portion which is formed integrally with the valve tube portion and with which the first sealing ring and the second sealing ring are in tight contact, and an inner shaft portion which is insert-molded on an inner side of the outer shaft portion in a radial direction, is rotatably supported by the first bearing and the second bearing, and has rigidity higher than the rigidity of the outer shaft portion, and wherein surfaces of the outer shaft portion facing the outside in the axial direction respectively configure the first stepped surface and the second stepped surface.

4. A control valve comprising:
a casing that has
  a tube portion in which an outflow opening for a fluid is formed, and
  a first shaft support wall and a second shaft support wall which respectively block both end opening portions of the tube portion in an axial direction;
a rotor that has
  a rotary shaft which includes a first side end portion rotatably supported by the first shaft support wall via a first bearing and a second side end portion rotatably supported by the second shaft support wall via a second bearing, and
  a valve tube portion which surrounds the rotary shaft and in which a communication opening communicating with the outflow opening in accordance with a rotation of the rotary shaft is formed;
a first sealing ring that is disposed between a position on an inner side of the first bearing in the axial direction on the first shaft support wall and the rotary shaft; and
a second sealing ring that is disposed between a position on an inner side of the second bearing in the axial direction on the second shaft support wall and the rotary shaft, wherein the first side end portion of the rotary shaft is formed into a stepped shape having a first stepped surface which is able to come into contact with the first bearing from the inner side in the axial direction, wherein the second side end portion of the rotary shaft is formed into a stepped shape having a second stepped surface which is able to come into contact with the second bearing from the inner side in the axial direction, wherein areas of the first side end portion and the second side end portion projected in the axial direction are set to be equal to each other, wherein open-to-atmosphere portions which allow portions on outer sides of the first sealing ring and the second sealing ring in the axial direction to be open to the atmosphere are respectively formed on the first shaft support wall and the second shaft support wall, wherein the rotary shaft has an outer shaft portion which is formed integrally with the valve tube portion and with which the first sealing ring and the second sealing ring are in tight contact, and an inner shaft portion which is insert-molded on an inner side of the outer shaft portion in a radial direction, is rotatably supported by the first bearing and the second bearing, and has rigidity higher than the rigidity of the outer shaft portion, and wherein surfaces of the outer shaft portion facing the outside in the axial direction respectively configure the first stepped surface and the second stepped surface, wherein a regulation wall surrounding a periphery of the open-to-atmosphere portion is formed on at least one shaft supporting wall of the first shaft support wall and the second shaft support wall.

* * * * *